United States Patent
Lu et al.

(10) Patent No.: US 9,762,630 B2
(45) Date of Patent: Sep. 12, 2017

(54) SYSTEMS AND METHODS FOR PARENTS' CONNECTION AND COMMUNICATION PLATFORM

(71) Applicants: Elaine Lu, San Jose, CA (US); Robert Huang, San Jose, CA (US)

(72) Inventors: Elaine Lu, San Jose, CA (US); Robert Huang, San Jose, CA (US)

( * ) Notice: Subject to any disclaimer, the term of this patent is extended or adjusted under 35 U.S.C. 154(b) by 518 days.

(21) Appl. No.: 14/173,631

(22) Filed: Feb. 5, 2014

(65) Prior Publication Data

US 2014/0222918 A1    Aug. 7, 2014

Related U.S. Application Data

(60) Provisional application No. 61/761,248, filed on Feb. 6, 2013, provisional application No. 61/878,048, filed on Sep. 16, 2013, provisional application No. 61/879,655, filed on Sep. 18, 2013, provisional application No. 61/886,665, filed on Oct. 4, 2013.

(51) Int. Cl.
    *H04L 29/06* (2006.01)
    *G06Q 50/20* (2012.01)
    *G06Q 10/10* (2012.01)

(52) U.S. Cl.
    CPC .......... *H04L 65/403* (2013.01); *G06Q 10/10* (2013.01); *G06Q 50/20* (2013.01); *G06Q 50/205* (2013.01)

(58) Field of Classification Search
    CPC .............................. G06C 50/20; G06C 50/205
    See application file for complete search history.

(56) References Cited

U.S. PATENT DOCUMENTS

| | | | | |
|---|---|---|---|---|
| 5,310,349 A * | 5/1994 | Daniels | .................... | G09B 7/00 345/156 |
| 6,470,171 B1 * | 10/2002 | Helmick | .................. | G09B 5/00 434/350 |
| 6,505,031 B1 * | 1/2003 | Slider | ...................... | G09B 7/00 434/118 |
| 8,172,578 B2 * | 5/2012 | Clark | ................. | G06Q 10/0639 434/118 |
| 9,524,649 B1 * | 12/2016 | Brown | ..................... | G09B 5/00 |
| 2002/0169822 A1 * | 11/2002 | Packard | ................... | G09B 7/00 709/203 |

(Continued)

FOREIGN PATENT DOCUMENTS

KR    10-2007-0007405    1/2007
KR    10-2009-0000079    1/2009

OTHER PUBLICATIONS

International Preliminary Report on Patentability, dated Aug. 20, 2015, Application No. PCT/US2014/014950.

*Primary Examiner* — Lashonda Jacobs
(74) *Attorney, Agent, or Firm* — Nicholson, De Vos, Webster & Elliot, LLP

(57) ABSTRACT

A method implemented by a server in communication with a client for supporting an online communication platform for parents of children enrolled at a school. The method includes receiving a class search request from the client describing class search criteria. The server sends a set of virtual classes associated with the selected virtual school that match the class search criteria. The server receives a selection of a virtual class from the client where the virtual class responds to a real-world class offered during an academic term. The server adds a user as a member of the virtual class.

25 Claims, 12 Drawing Sheets

(56) References Cited

U.S. PATENT DOCUMENTS

| | | | | |
|---|---|---|---|---|
| 2004/0153509 | A1* | 8/2004 | Alcorn | G06Q 30/06 709/205 |
| 2005/0219056 | A1* | 10/2005 | McHugh | G07C 9/00111 340/573.4 |
| 2006/0194186 | A1* | 8/2006 | Nanda | G09B 7/02 434/350 |
| 2007/0255805 | A1* | 11/2007 | Beams | G09B 7/00 709/218 |
| 2008/0059484 | A1* | 3/2008 | Packard | G06Q 50/20 |
| 2008/0319949 | A1* | 12/2008 | Irving | G06Q 50/205 |
| 2009/0197234 | A1* | 8/2009 | Creamer | G09B 7/00 434/350 |
| 2010/0227304 | A1* | 9/2010 | Horikawa | G09B 7/00 434/350 |
| 2012/0173511 | A1* | 7/2012 | Eto | G06F 17/301 707/711 |
| 2013/0089849 | A1* | 4/2013 | Huang | G09B 5/08 434/352 |
| 2013/0330704 | A1* | 12/2013 | Creamer | G09B 7/00 434/362 |
| 2014/0004496 | A1* | 1/2014 | Reddy | G09B 7/02 434/322 |
| 2014/0052663 | A1* | 2/2014 | Kelley | G06Q 30/0282 705/347 |
| 2015/0304056 | A1* | 10/2015 | Guo | H04L 25/00 455/63.1 |

* cited by examiner

SYSTEMS AND METHODS FOR PARENTS' CONNECTION AND COMMUNICATION PLATFORM

RELATED APPLICATIONS

The present application claims the benefit of priority from U.S. Provisional Application No. 61/761,248 entitled "System and Method for Parents' Connection and Communication Platform" filed Feb. 6, 2013, U.S. Provisional Application No. 61/878,048 entitled "System and Method of Children Carpool, Drop-off, Pick-up and/or Afterschool Activities Matching for Parents" filed Sep. 16, 2013, U.S. Provisional Application No. 61/879,655 entitled "System and Method for Parents' Connection and Communication Platform" filed Sep. 18, 2013, U.S. Provisional Application No. 61/886,665 entitled "System and Method for Automatic Group Creation and User Membership Assignment of Online Community" filed Oct. 4, 2013, the disclosures of which is hereby incorporated herein in its entirety by reference.

TECHNICAL FIELD

The present invention relates to systems and methods of an online communication platform and, more particularly, to an online communication platform allows parents of children at a school to connect and communicate with each other directly without having to obtain other parents' contact information first.

BACKGROUND

Parents love and care for their children and want to find better ways to help their children grow academically and socially. Often times, parents want to be more informed about their child's school related issues and connect with other parents at their child's school. Schools play an integral part in a child's educational and social development. Thus, it is important for parents to know about their child's school related issues and to stay connected with other parents.

The Internet has changed how people obtain information and communicate. Online social networking platforms have become increasingly popular as they allow users to stay connected with friends and family. Online social networking platforms can also serve as a valuable tool to find people with similar interests or backgrounds and to form new relationships with them. Also, online social networking platforms are a valuable tool for facilitating communication between people who may be geographically dispersed.

SUMMARY

A method implemented by a server in communication with a client is described for supporting an online communication platform for parents of children enrolled at a school. The method includes receiving a class search request from the client describing class search criteria. The server sends a set of virtual classes associated with the selected virtual school that match the class search criteria. The server receives a selection of a virtual class from the client where the virtual class responds to a real-world class offered during an academic term. The server adds a user as a member of the virtual class.

A system is described for supporting an online communication platform for parents of children enrolled at a school. The system includes a processor, a data storage to store data, a web server module, and a school management module. The web server module is executed by the processor to receive class search requests describing class search criteria. The school management module is executed by the processor to query the data storage for a list of virtual classes that match the class search criteria. The school management module is also configured to provide a query result to the web server module to send to a client application. The school management module is further configured to add the user to a virtual class in response to receiving a virtual class join request where the virtual class corresponds to a real-world class offered during an academic term.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
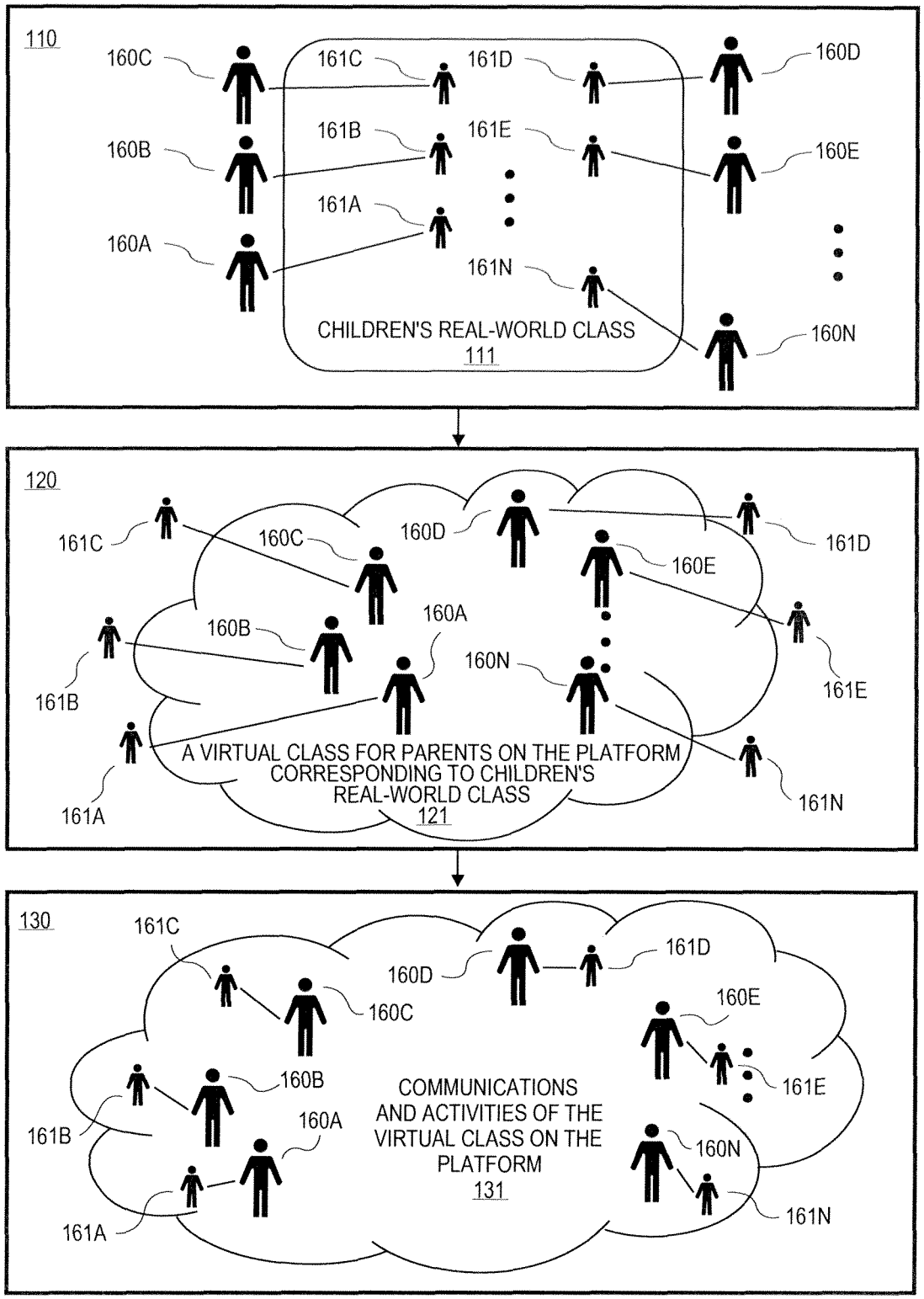
FIG. 1 is a parent connection status transition diagram showing a conceptual overview of how, in one embodiment, parents of children at a school are enabled to connect and communicate with each other through an online platform even if they do not know each other and do not have each other's contact information.

In the following section, in order to provide a thorough understanding of embodiments, the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein, rather, these embodiments are provided so that this disclosure will be thorough and complete, and will convey the scope of the invention to those skilled in the art.

In the description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an" and "the" are intended to include the plural forms as we unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), a portable digital video disc read-only memory (DVD/Blu-Ray), a hard disk drive (HDD), and a solid-state drive (SSD).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted/removed between the blocks that are illustrated. Moreover, although some of the diagrams include arrows on communication paths to show a primary direction of communication, it is to be understood that communication may occur in the opposite direction to the depicted arrows.

Where possible, any terms expressed in the singular form herein are meant to include the plural form and vice versa, unless explicitly stated otherwise. The terms "school" or "schools" mentioned in this invention may include, but not limited to, daycares, pre-schools, kindergartens, elementary schools, middle schools, high schools, colleges, extended cares, after-school classes, training classes, and any activity teams. The terms "parent" or "parents" also include any person who is a guardian of the child or any person, who guards, protects, or takes care of the child.

Often times, parents have difficulty obtaining information about their children, children's friends, and their children's school related issues, such as classroom questions, homework issues, who their children's friends are, their children's activities and performance in school etc. When parents wish to organize activities for their children outside of school, such as a play date, they need to first get the contact information of other parents before they can start to organize the play date. Some schools provide a mailing list for parents to communicate with teachers but parents cannot communicate directly among parents if they do not know each other. Some parents by to create their own parent oriented groups but face difficulty gathering contact information of other parents as schools normally do not distribute private information of parents to third parties. Also, even when there is a group set up for a class, other parents who want to join the group need to know the name of the group first. Sometimes multiple groups are created for the same class due to lack of communication. In addition, currently, the primary form of communication between schools and parents are through regular mail or school notes given to students to forward to their parents, which can be easily lost or students may not give the notes to the parents.

Websites for alumni classmates, and yearbook are for people who attended or graduated from a particular school, college, or university to re-connect and catch-up. These websites do not provide a platform for parents to deal with issues relating to their children or provide a platform that allows schools to communicate with parents.

Furthermore, current networking systems are either for social connections or for professional connections. These types of networking systems create a number of challenges and inefficiencies for parents at a school that wish to communicate with one another. The connections created in social and professional networking environments are usually not the right audience to discuss issues relating to children's classes or general children related concerns. Also, parents need to find out the contact information of other parents first before being able to communicate with one another. Furthermore, once the children change classrooms, grades or schools, parents face the challenge of having to build new connections.

Some websites provide generic groups but they are normally free-form or non-structured. They are either not parent oriented, or they have no detailed level categories or have no effective hierarchy structure such as schools, grade, class and year attend of attendance etc. It is difficult for a parent to find groups that they are interested in and sometimes different parents create duplicate groups for the same school under different names. Also, instead of having options to target communication to a particular level of audience e.g. school, grade and/or class level etc.), communication can only be made either publically to all or just to the individual groups they belong to.

As such, an open effective parent communication platform is needed for parents to help their children to succeed socially and academically.

FIG. 1 is a parent connection status transition diagram showing a conceptual overview of how, in one embodiment, parents of children at a school are enabled to connect and communicate with each other through an online platform even if they do not know each other and do not have each other's contact information.

As shown in block 110, parents 160A, 160B, 160C, 160D, 160E . . . 160N have their respective children 161A, 161B, 161C, 161D, 161E . . . 161N enrolled in the same real-world class 111, but parents have no open communication channel among themselves. This is atypical situation in schools. Parents that wish to communicate with other parents of the class must first obtain the contact information of other parents. However, parents can have difficulty gathering contact information of other parents because they do not know the other parents and because schools do not normally distribute private information of parents to third parties.

Block 120 in FIG. 1 shows the change in connection status for parents 160A-160N through a virtual class 121 on the online platform corresponding to children's real-world class according to an embodiment of the present invention. After joining the virtual class on the platform, parents 160A-160N can communicate with each other directly without having to obtain the contact information of other parents first.

As shown in block 130, parents 160A-160N in virtual class 121 who initially did not know each other can now communicate with each other about school and class related matters for their children or any other matter. They can also organize events for their children, such as birthday parties, play dates, and other similar activities.

The online platform allows users to join virtual schools, virtual grades, virtual classes, and virtual groups on the platform that correspond to their children's real-world school, real-world grade, real-world class, and real-world groups. Once a user joins, they can communicate with other users within the same virtual school, virtual grade, virtual class or virtual group.

Figure 12:
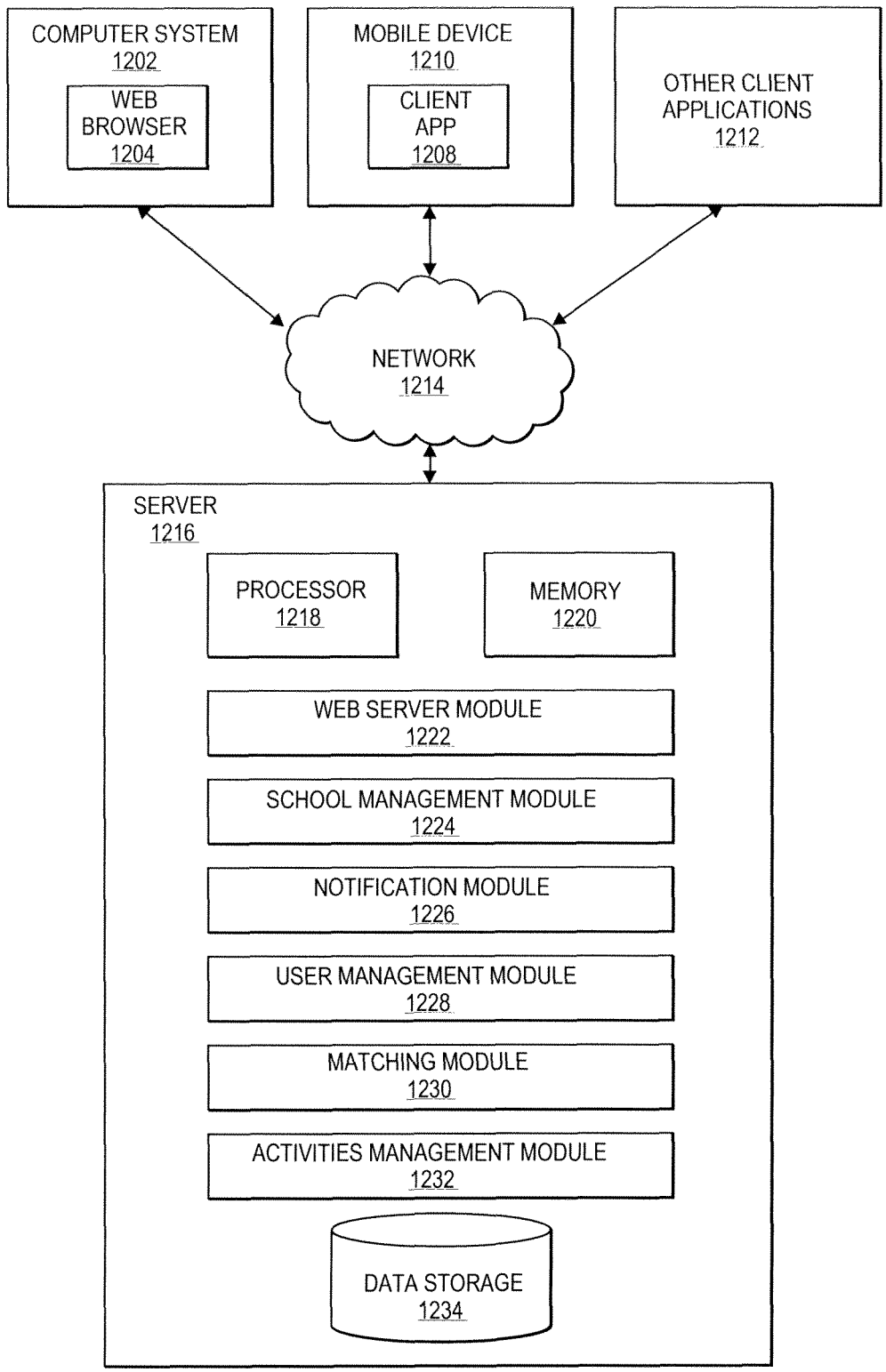
FIG. 12 illustrates one embodiment of a system that can implement the online platform.

FIG. 12 illustrates one embodiment of a system that can implement the online platform described in the present disclosure. The system includes one or more modules and not all of the modules may be required to practice the invention, and variations in the arrangement and type of the modules may be made without departing from the spirit of the invention.

As shown in FIG. 12, the system can include various client applications such as a web browser 1204 running on a computer system 1202, a client app 1208 running on a mobile device 1210, and other client applications 1212 running on any computing device capable of receiving messages over a network 1214 from a server 1216 and/or sending messages over a network 1214 to a server 1216.

The server 1216 can include one or more processors 1218, memory 1220, web server module 1222, school management module 1224, notification module 1226, user management module 1228, matching module 1230, activities management module 1232, and data storage 1234. While an embodiment with a single server 1216 is illustrated, one skilled in the art would understand that the functions and structures described herein can be distributed over any number of servers.

The processor 1218 may include one or more data processing circuits, such as a general purpose and/or special purpose processor (e.g., microprocessor and/or digital signal processor) that may be collocated or distributed across one or more networks. The processor 1218 is configured to execute various modules by loading programs and data to memory 1220 to perform some or all of the operations and methods that are described herein for one or more of the embodiments of the present invention.

The web server module 1222 receives and responds to hypertext transfer protocol (http), secure hypertext transfer protocol (https) or other service requests from client applications 1204, 1208, or 1212 such as a school search requests, requests to join a class, and other types of requests according to embodiments of the present invention. The server 1216 may also include a web service API or other interfaces to handle communication from and to client applications 1204, 1208, or 1212. The web server module 1222 receives these requests from the client applications 1204, 1208, or 1212 of the remote devices 1202, 1210 over the network 1214. The web server module 1222 then coordinates with the other modules to service the request and return a response in the form of a hypertext markup language (HTML) or similarly formatted document to be displayed by the client applications 1204, 1208, or 1212 to a user.

The school management module 1224 can be executed by a processor 1218 to manage virtual schools, virtual grades, and virtual classes, and other groups on the platform. In one embodiment, the school management module 1224 can handle requests from users to search for schools, grades, or classes by querying the data storage 1234 and passing the query result back to the web server module 1222, which converts the query result to a user readable format to send to client applications 1204, 1208, or 1212. The school management module 1224 can also handle requests from users to join schools, grades, or classes. With regard to join requests, the received data from the user via the corresponding client application 1204, 1208, or 1212 is utilized to generate a set of records including a school record, grade record, class record and/or user record if they do not already exist. These records are stored in the data storage 1234 and utilized to track the inter-relationships between schools, grades, classes and users.

The notification module 1226 can be executed by a processor 1218 to send notification to users of the online platform. Notification may be sent as a message or post on the platform. Notification may also be sent to a user's e-mail address, via text message or other communication methods to a user's mobile device 1210 or other client applications 1212. Other forms of communicating notifications to users are contemplated as well. Notification module 1226 can be used by other modules to notify users. For example, school management module 1224 can send a user a confirmation message when the user successfully joins a virtual class. Notification module 1226 can also send notification to users based on a user's membership in a virtual class, virtual grade, or other group memberships. Membership information can be obtained from school management module 1224, which accesses membership information from data storage 1234. Also, notification can be sent based on a user's notification preferences.

The user management module 1228 can be executed by a processor 1218 to manage registration of users. A person who is new to the platform may send a registration request from any client application 1204, 1208, or 1212 to join the online platform. The web server module 1222 receives the request and forwards the request to the user management module 1228. In one embodiment, the user management module 1228 processes the request by approving the request and saving the new user's account information in data storage 1234. The user management module 1228 may also reject the request and generate an error message. In one embodiment, the user management module 1228 can use notification module 1226 to email the new user with account creation confirmation and/or login information, or send an error message to the client application 1204, 1208, or 1212 that registration has failed.

The activities management module 1232 handles activities requests from users made through client application 1204, 1208, or 1212, such as discussions, events, carpools and pickups and similar activities. Activities can be coordinated through sending and replying to invitation messages, posting messages on the platform, making requests for carpool and/or drop-off/pickup on the online platform, or any other methods for organizing activities. Activities management module 1232 may use matching module 1230 to find matching users that can fulfill a requesting user's request for carpool and/or drop-off/pickup. Matching module 1230 may find matches by querying data storage 1234 for users that match one or more criteria indicated by the requesting user.

According to an embodiment, the platform can be implemented using different programming languages such as, but not limited to, Java, PHP, Ruby and/or Perl etc. Data storage 1234 can be implemented by, but not limited to, Oracle, MSSQL, MySQL DBMS, file system and/or in memory storage or through similar data storage mechanisms.

Figure 2:
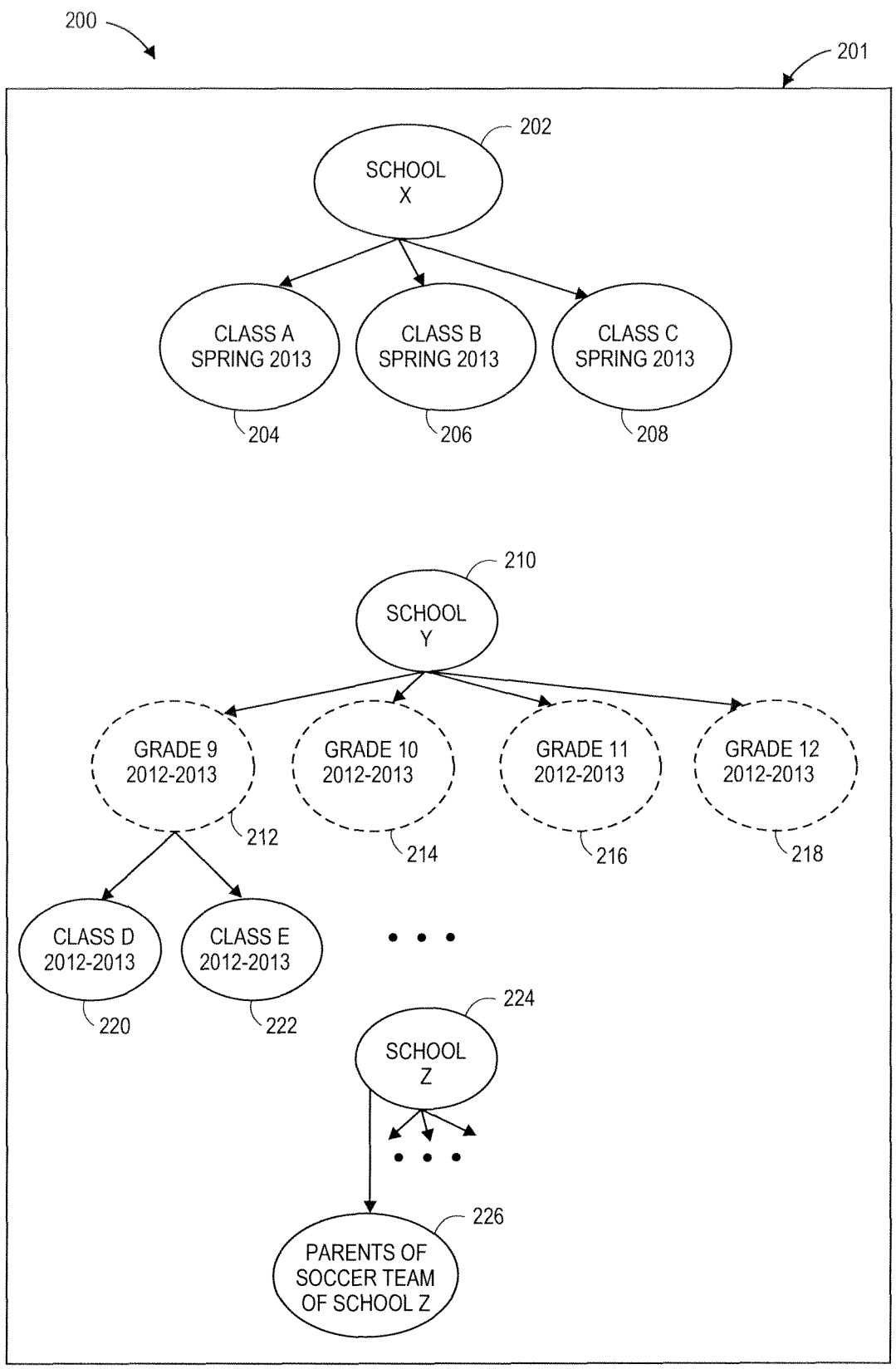
FIG. 2 illustrates exemplary relationship diagrams of virtual schools, virtual grades, virtual classes, and virtual activity groups in a hierarchical structure.

FIG. 2 illustrates exemplary relationship diagrams of schools, grades, classes, and activity groups in a hierarchical structure. The online platform can utilize a hierarchical structure such as the structures shown in FIG. 2 to organize the various virtual schools, virtual grades, virtual classes, and virtual groups within the online platform. Boundary 201 illustrates that the various hierarchical structures shown in FIG. 2 may be used within the online platform to reflect the real-world structure of real-world schools, real-world grades, real-world classes, and real-world activity groups. Although FIG. 2 shows a relationship of schools, grades, and classes, and activity groups in a hierarchical structure, the structure is not limited thereto. More levels of hierarchy can be added to the structure without departing from the spirit and scope of the present invention. Also, other hierarchical structures or non-hierarchical structures can be used. For example, categories, tags, labels, or class naming conventions can be used to structure and organize the virtual schools, virtual grades, virtual classes, and virtual groups on the online platform.

Referring to FIG. 2, as an example, school X 202 has several different virtual classes, where each virtual class is associated with an academic term. For example, Class A 204, Class B 206, and Class C 208 are each associated with the Spring 2013 academic term. Each virtual class may be uniquely identified at least by school, class name, and academic term. In another embodiment, each virtual class can be identified by a globally unique identifier that corresponds to the virtual school, virtual class, and the academic term. Although this specific example uses a semester as an academic term, other academic terms such as quarter, trimester, school year, or any other type of academic term can be used.

Still referring to FIG. 2, in another example, school Y 210 has several virtual grades (e.g., Grade 9 212, Grade 10 214, Grade 11 216, and Grade 12 218) and virtual classes (e.g., Class D 220 and class E 222). Some grades, such as Grade 9 212, have one or more virtual classes and some grades may have no virtual classes. In the scenario that a virtual grade has no virtual classes, the virtual grade can essentially act as a virtual class. For example, some high schools are organized by grade (e.g., freshman, sophomore, junior, senior) but the classes offered at the school are not necessarily associated with a grade. A hierarchical group structure for such a school may have virtual grades that do not have any virtual classes. In this scenario, the virtual grades can essentially act as virtual classes in that a user can search and join a virtual grade, and perform any of the features described herein with regard to virtual classes at the virtual grade level, such as posting messages, arranging car pools, creating a play date, etc. Each virtual grade is associated with an academic term. For example Grade 9 212, Grade 10 214, Grade 11 216, and Grade 12 218 are each associated with the 2012-2013 school year. Each virtual class is also associated with an academic term. For example class D 220 and class E 222 are associated with the 2012-2013 school year. Although this specific example uses a school year as an academic term, other academic terms such as quarter, trimester, semester, or any other type of academic term can be used. In another example, school Z 224 has a virtual activity group for parents of School Z's soccer team 226.

The hierarchical structure organizes virtual schools, virtual grades, virtual classes, and virtual activity groups so that users can easily navigate, find, and join groups (e.g., virtual classes). Also, the hierarchical structure allows users or schools to communicate, share information, and organize activities at different levels in the hierarchical structure to which they belong. For example, a user that belongs to class D 220 can post a message to class D 220, or to grade 9 212 or to school Y 210. Rules can be set for posts to be posted at different levels. For example, a post posted to a higher level in the hierarchy can be made visible and/or communicated to lower levels in the hierarchy. For example, if a parent from class D 220 posts a question to grade 9 212, all parents in grade 9 212 and all parents in classes under grade 9 212 (i.e., Class D 220 and Class E 222) will be able to see the posted question. Different rules for visibility of posts based on the hierarchical structure can be set depending on usage and need.

Figure 3:
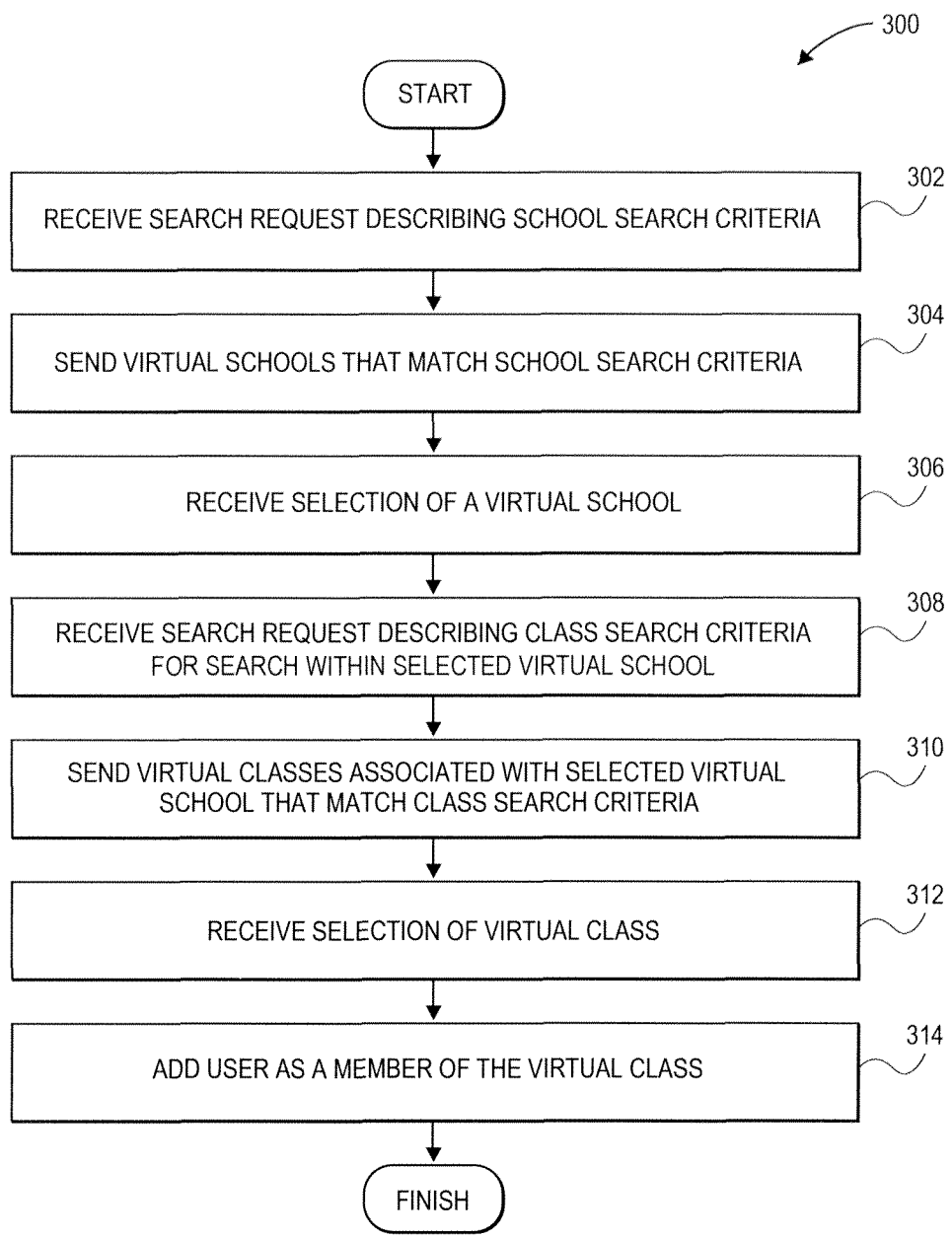
FIG. 3 is a flow diagram illustrating one embodiment of a process by a server to add a user as a member of a virtual class.

FIG. 3 is a flow diagram illustrating one embodiment of a process by a server 1216 to add a user as a member of a virtual class. At block 302, the web server module 1222 receives a school search request from a user via a client application 1204, 1208, or 1212. The search request can have any format or content. In one embodiment, the search request includes school search criteria. In one embodiment, school search criteria can include, but is not limited to, school location, school type (e.g., primary, secondary or similar categorization) and/or school name. For example, a search request can request a search for all primary schools located in Palo Alto, Calif.

At block 304, the web server module 1222 sends a set of virtual schools that match the school search criteria to the client application 1204, 1208, or 1212 that sent the school search request. In one embodiment, each virtual school corresponds to a real-world school. As used herein a 'virtual school' is a representation of an instance of the real-world school as a set of inter-relationships with the hierarchical information discussed herein above including classes, grades, academic terms, students, and users (e.g., parents).

The school management module 1224 can determine the set of virtual schools that match the school search criteria by querying data storage 1234. The server 1216 can then send a result of the query to the client application 1204, 1208, or 1212 via the web server module 1222. The results can have any format or organization and can provide an interactive interface for the user to select one of the virtual schools in a search result. For example, the results can be presented as a listing of virtual schools matching any of the search criteria that are ranked by degree of relevance, alphanumerically or similarly organized.

At block 306, the web server module 1222 receives a selection of a virtual school from the set of virtual schools. The school management module 1224 saves this selected virtual school and uses it to narrow the search for a virtual class in block 308 and block 310.

At block 308, the web server module 1222 receives a class search request from a user via a client application 1204, 1208, or 1212 describing class search criteria for search within the selected virtual school. In one embodiment, class search criteria can include, but is not limited to, child name, class name, grade, teacher name, academic term, and classroom name. For example, a search request can request a search for all classes that are taught by teacher Ms. Zachary. In one embodiment, class search can be performed without performing a school search first. For example, school name and/or location can be included as part of the class search criteria. In one embodiment, virtual grades can be searched and joined in a similar fashion to the virtual class search.

At block 310, the web server module 1222 sends a set of virtual classes associated with the selected virtual school that match the class search criteria. In one embodiment, the virtual class corresponds to a real-world class offered by the real-world school. As used herein a 'virtual class' is a representation of an instance of the real-world class as a set of inter-relationships with the hierarchical information discussed herein above including schools, grades, academic terms, students, and users (e.g., parents). The school management module 1224 can determine the set of virtual classes that match the class search criteria by querying data store 1234. The server 1216 can then send a result of the query to the client application 1204, 1208, or 1212 via the web server module 1222. The result can have any format or organization and can provide an interactive interface for the user to select one of the virtual classes in a search result. For example, the results can be presented as a listing of virtual classes matching any of the search criteria that are ranked by degree of relevance, alphanumerically, or similarly organized.

At block 312, the web server module 1222 receives a selection of a virtual class from the set of virtual classes and at block 314, the school management module 1224 adds the user as a member of the selected virtual class. The user may be added to the virtual class by creating a relationship between the user and the virtual class in data storage 1234. In one embodiment, the school management module 1216 may validate that a child of the user is enrolled in the real-world class that corresponds with the virtual class before adding the user as a member of the virtual class. Validation that the user's child is enrolled in the real-world class can be done automatically by accessing school records or can be manually verified by a school administrator, system administrator, or other parents who are already members. In another embodiment, the school management module 1224 may validate that the user is actually a parent of the child before adding the user as a member of the virtual class. Other validations can be performed to ensure that users are not able to join virtual schools or virtual classes to which they are not authorized.

Figure 4:
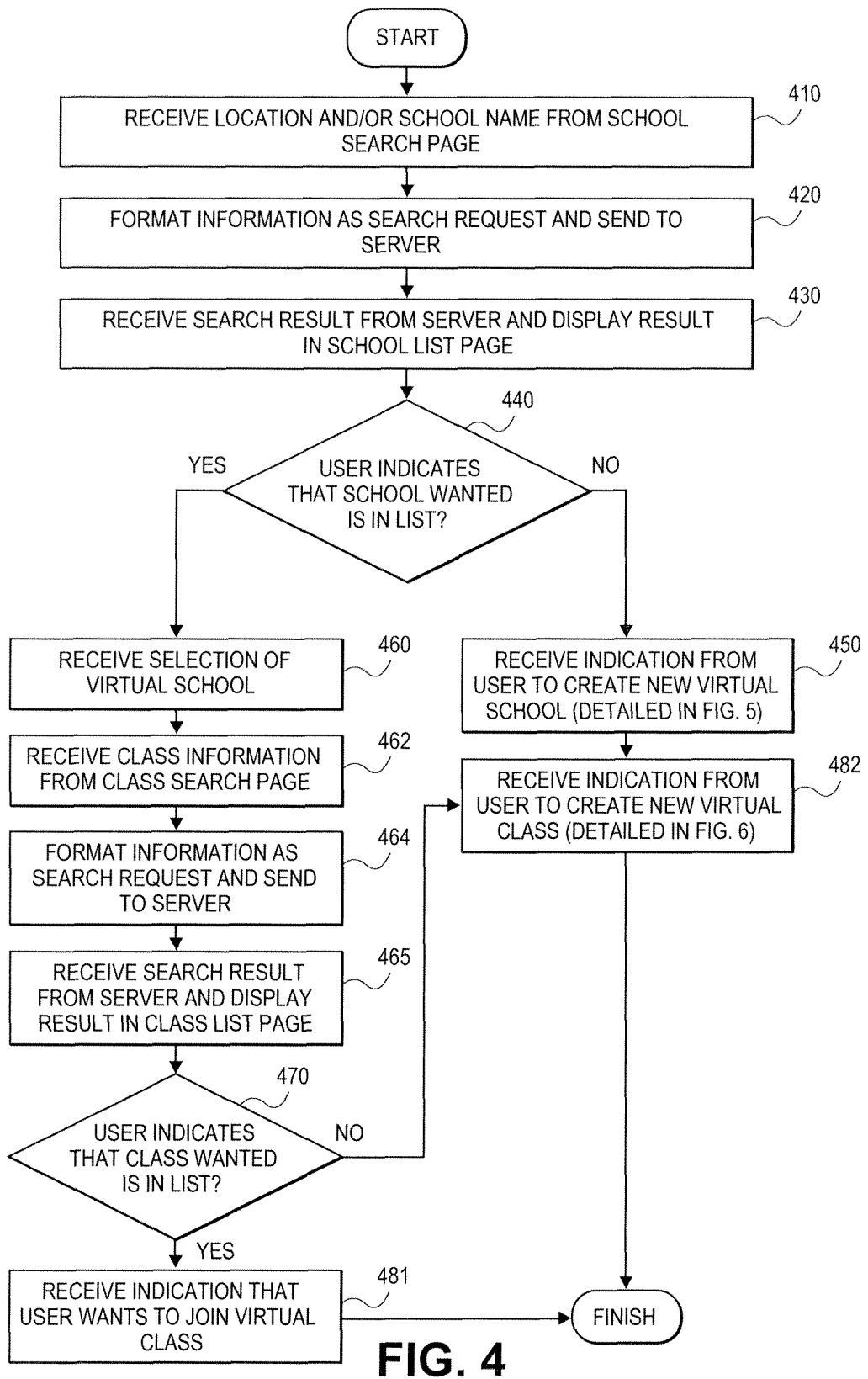
FIG. 4 is a flow diagram illustrating one embodiment of a process by which a user can interact with the online platform to join a virtual class on the platform that corresponds to a real-world class of the user's child from the client application and user experience perspective.

FIG. 4 is a flow diagram illustrating one embodiment of a process by which a user an interact with the online platform to join a virtual class on the platform that corresponds to a real-world class of the user's child from the client application 1204, 1208, or 1212 and user experience perspective.

Referring to FIG. 4, a user opens a school search page from a client application 1204, 1208, or 1212 and fills in location and/or school name information to search for schools. Upon receiving this input from a user through a user interface of the client application 1204, 1208, or 1212 at block 410, the client application 1204, 1208, or 1212 formats the information as a search request and sends it to the server 1216 at block 420. The server 1216 receives the search request and queries the data storage 1234 for virtual schools that match the location and/or school name and sends the query result to the client application 1204, 1208, or 1212. The client application 1204, 1208, or 1212 receives these results and displays them to the user in a school list page as shown in block 430.

At decision block 440, the client application 1204, 1208, or 1212 receives a user input where the user checks the school list page generated from the returned results to see if the school that the user wants is in the list. If the school is not found, at block 450, the received input from the user indicates that the user wants to create a new virtual school that corresponds to the real-world school of the user's child (detailed in separate diagram FIG. 5). After creating the new virtual school, the user may also select an option in the client application 1204, 1208, or 1212 to create a new virtual class that matches the real-world class of the user's child at block 482.

If the school that the user wants is found in the list, at block 460, the client application 1204, 1208, or 1212 receives selection of the school from the user. The client application 1204, 1208, or 1212 then displays a class search page to the user and the user fills in class information on the class search page to search for classes. Upon receiving this input from a user through a user interface of the client application 1204, 1208, or 1212 at block 462, the client application 1204, 1208, or 1212 formats the information as a search request and sends it to the server 1216 at block 464. The server 1216 receives the search request and queries the data storage 1234 for virtual classes that match the class information and returns a class list page from the query results. The client application 1204, 1208, or 1212 receives the query results and displays them to the user as shown in block 465. At decision block 470, the client application 1204, 1208, or 1212 receives a user input where the user checks the class list page generated from the returned results to see if the class that the user wants is in the list. If the class is not found, at block 482, the received input from the user indicates that the user wants to create anew virtual class that corresponds to the real-world class of the user's child (detailed in separate diagram FIG. 6). If the class that the user wants is found, at block 481, the client application 1204, 1208, or 1212 receives input from the user indicating that the user wants to join the virtual class.

Figure 5A:
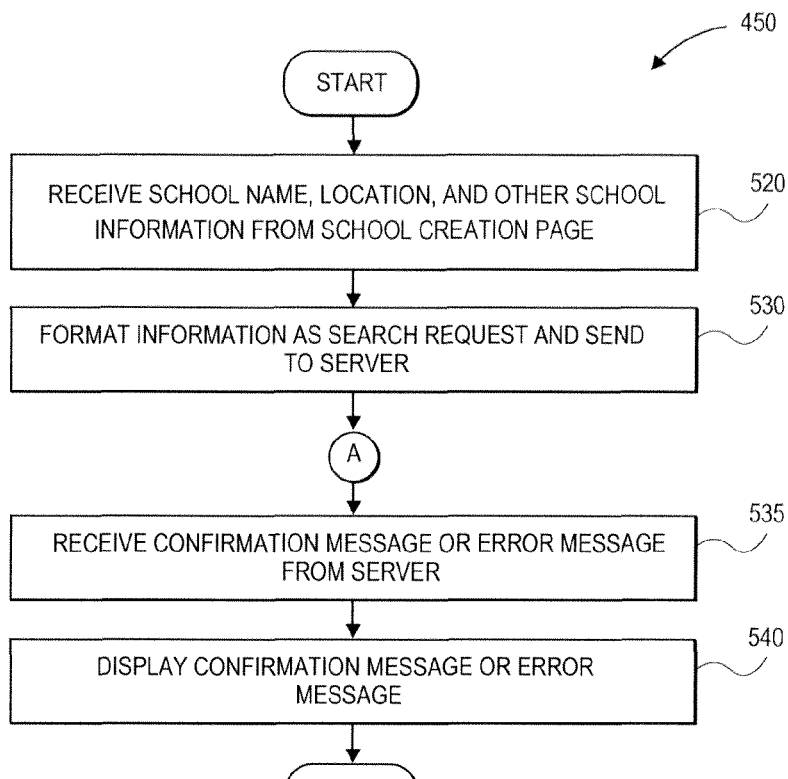
FIG. 5A is a flow diagram illustrating one embodiment of how a user can interact with the platform to create a new virtual school on the platform from the client application and user experience perspective.
Figure 5B:
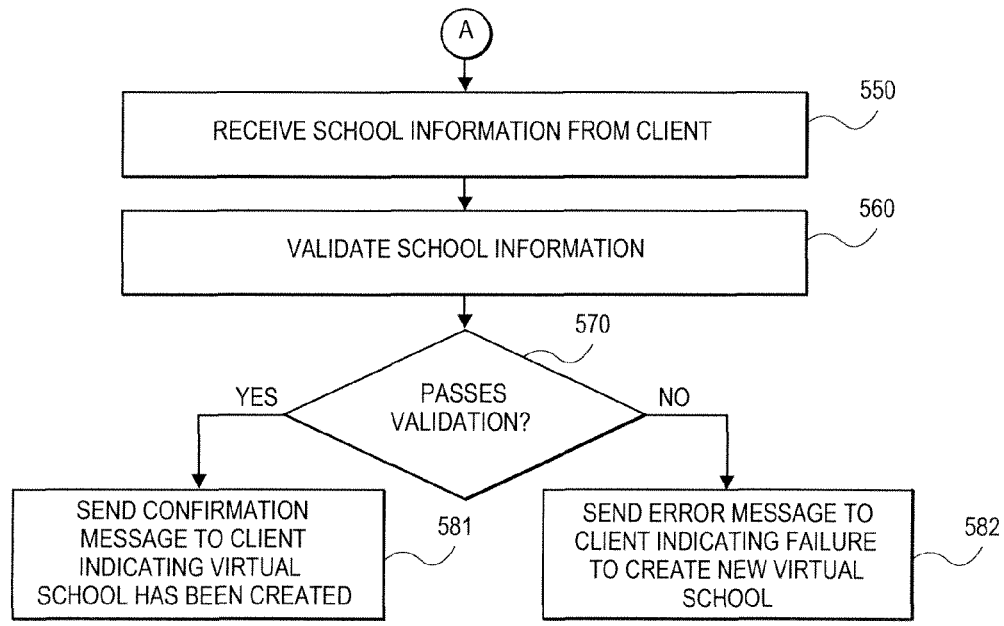
FIG. 5B is a flow diagram illustrating one embodiment of how a server processes a request to create anew virtual school on the platform.

FIG. 5A is a flow diagram illustrating one embodiment of how a user can interact with the platform to create a new virtual school on the platform from the client application 1204, 1208, or 1212 and user experience perspective. FIG. 5B is a flow diagram illustrating one embodiment of how a server processes a request to create a new virtual school on the platform.

Referring to FIG. 5A, a user opens a school creation page from a client application 1204, 1208, or 1212 and fills in school name, location, and/or other school information as necessary then submits the page. Upon receiving this input from a user through a user interface of the client application 1204, 1208, or 1212 at block 520, the client application 1204, 1208, or 1212 formats the information as a school creation request and sends it to server 1216 as shown in block 530. Now referring to FIG. 5B, the server 1216 receives school information from client application 1204, 1208, or 1212 at block 550 and validates the submitted information at block 560. In one embodiment, the validation can check if the school name is valid or check if there is already an existing virtual school in the platform with the same school information entered by the user. In one embodiment, client application 1204, 1208, or 1212 may validate the submitted information before sending the school creation request to the server 1216. At decision block 570, if the submitted school information passes validation, a new virtual school will be created and the server 1216 sends a confirmation message to client application 1204, 1208, or 1212 indicating that the new virtual school has been created as shown in block 581. On the other hand, if the submitted school information docs not pass validation, at block 582, the server 1216 sends an error message to client application 1204, 1208, or 1212 indicating the failure to create the new virtual school. Now referring to FIG. 5A, client application 1204, 1208, or 1212 receives the confirmation message or error message from the server 1216 at block 535 and displays the confirmation message or the error message at block 540. In some embodiments, the virtual school can be created by a system administrator, parents, or school staff.

In one embodiment, the platform can force or suggest a merge of duplicate schools or duplicate classes as it sees appropriate. The platform can also provide tools to allow a school/class's creator/administrator on the platform to merge duplicate schools/classes.

Figure 6A:
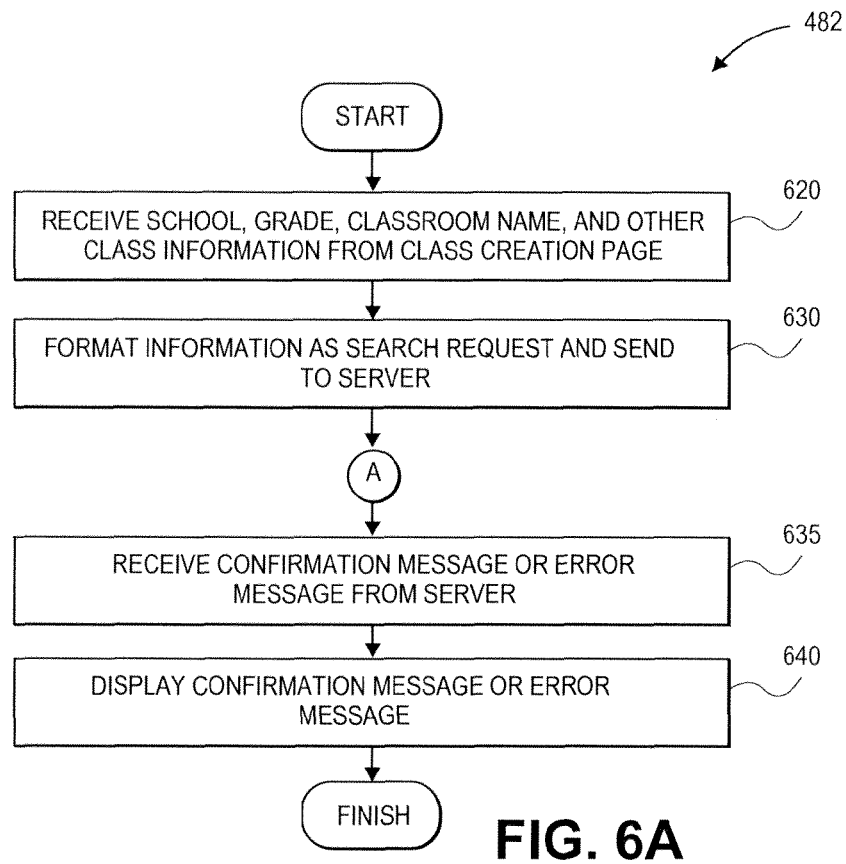
FIG. 6A is a flow diagram illustrating one embodiment of how a user can interact with the platform to create a new virtual class on the platform from the client application and user experience perspective.
Figure 6B:
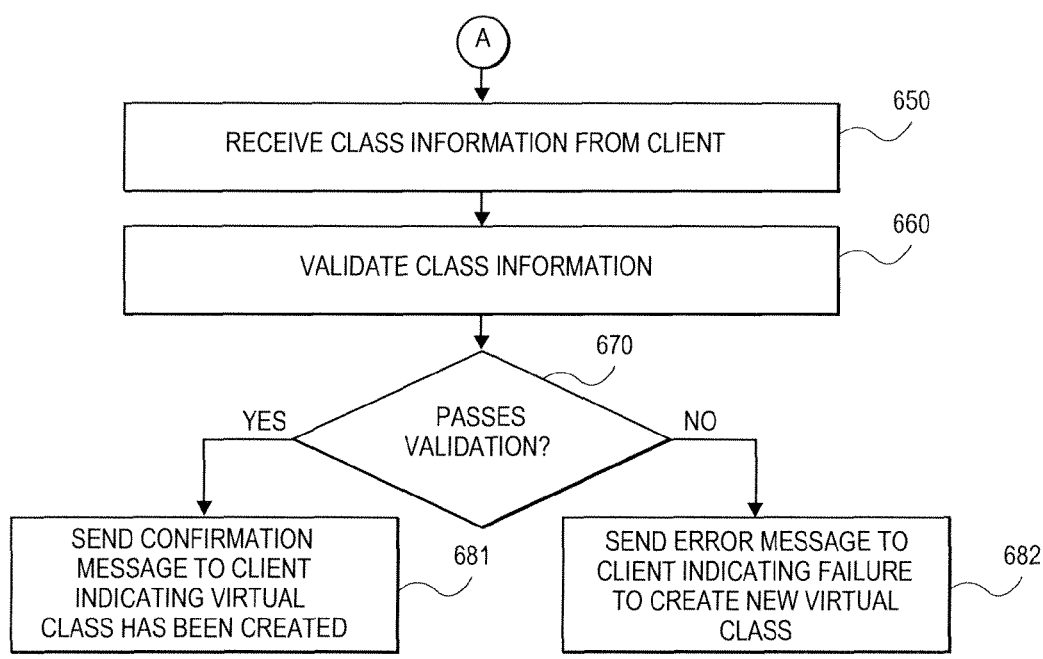
FIG. 6B is a flow diagram illustrating one embodiment of a process by a server to process a request to create a new virtual class on the platform.

FIG. 6A is a flow diagram illustrating one embodiment of how a user can interact with the platform to create anew virtual class on the platform from the client application 1204, 1208, or 1212 and user experience perspective. FIG. 6B is a flow diagram illustrating one embodiment of a process by a serve process a request to create a new virtual class on the platform.

Referring to FIG. 6A, a user opens a class creation page from a client application 1204, 1208, or 1212, and fills in school, grade, class name, academic term, and other class information as necessary then submits the page. Upon receiving this input from a user through a user interface of the client application 1204, 1208, or 1212 at block 620, the client application 1204, 1208, or 1212 formats the information as a class creation request and sends it to server 1216 as shown in block 630. Now referring, to FIG. 6B, the server 1216 receives class information from client application 1204, 1208, or 1212 at block 650 and validates the submitted information at block 660. In one embodiment, the validation can check if the class name is valid or check if there is already an existing virtual class in the system with the same class information entered by the user. In one embodiment, client application 1204, 1208, or 1212 may validate the submitted information before sending the class creation request to the server 1216. At decision block 670, if the submitted class information passes validation, a new virtual class will be created and the server 1216 sends a confirmation message to client application 1204, 1208, or 1212 indicating that the new virtual class has been created as shown in block 681. On the other hand, if the submitted class information does not pass validation, at block 682, the server 1216 sends an error message to client application 1204, 1208, or 1212 indicating the failure to create the new virtual class. Now referring to FIG. 6A, client application 1204, 1208, or 1212 receives the confirmation message or error message from the server 1216 at block 635 and displays the confirmation message or the error message at block 640. In some embodiments, the virtual class can be created by a system administrator, parents, or school staff.

Figure 7:
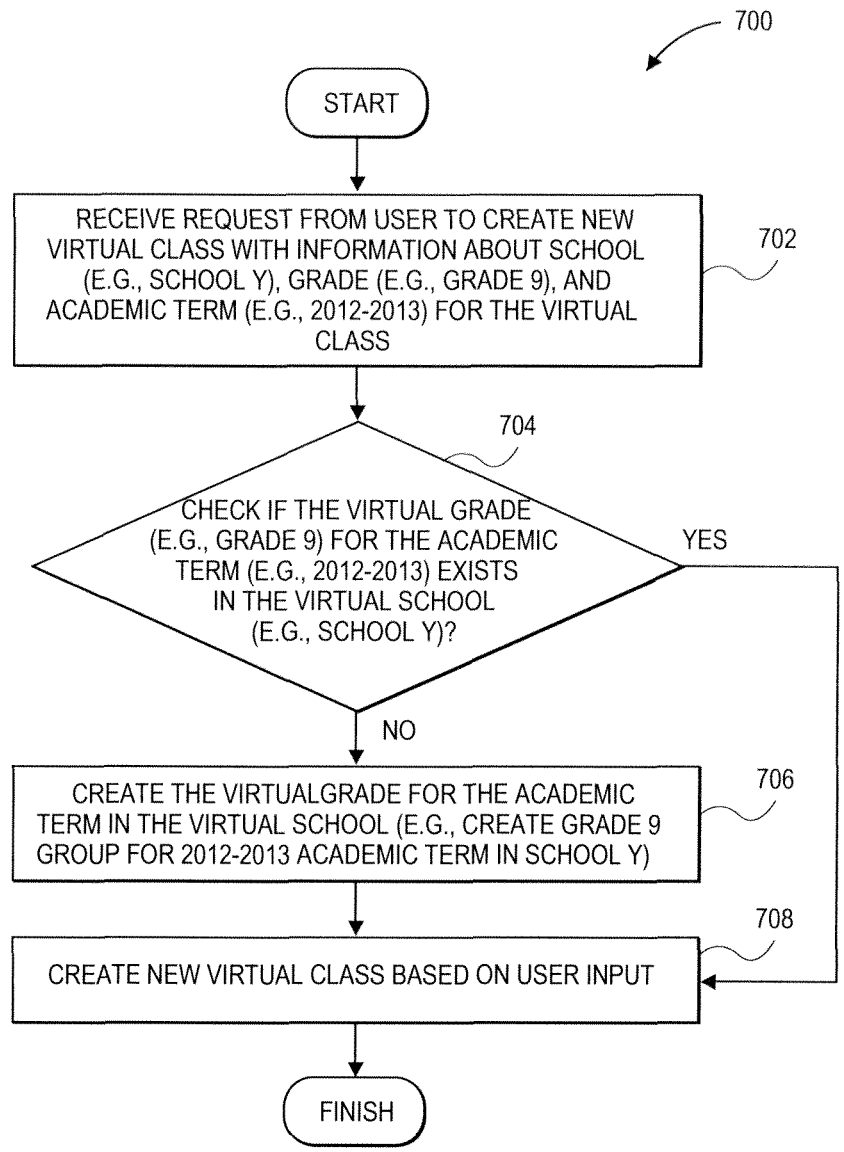
FIG. 7 is a flow diagram illustrating one embodiment of a process by a server to automatically create a virtual grade when creating a new virtual class on the platform.

FIG. 7 is a flow diagram illustrating one embodiment of a process by a server 1216 to automatically create a virtual grade when creating a new virtual class on the platform. As illustrated in FIG. 2, a school can be organized in a hierarchical structure where each school has several grades and each grade has several classes. Different schools may have different grades. For example, school Y has grades 9-12. However, some other schools may have grades K-5. Thus, it will be inappropriate for the platform to blankly create virtual grades K-12 for every virtual school as it will mislead the user and impact system performance. Also, creating each virtual grade manually can be time consuming. An aspect of the present invention is to automatically create virtual grades (if they do not already exist) when a virtual class is created.

Referring to FIG. 7, at block 702, the web server module 1222 receives a request from a user to create a new virtual class. The request is received from the user through a client application 1204, 1208, or 1212 and includes information about the virtual class such as school, grade, and academic term. For example, a user may request to create a virtual class D for grade 9 of school Y for the 2012-2013 academic term. At decision block 704, the school management module 1224 checks if the virtual grade for the academic term exists in the virtual school. For example, the school management module 1224 will check if grade 9 for the 2012-2013 academic term exists in school Y. The check can be done by performing a lookup over the data storage 1234 using the received information, by traversing a hierarchical data structure representing the virtual school to determine whether the virtual class exists or by a similar process.

If the school management module 1224 determines that the virtual grade for the academic term does not exist in the virtual school, the school management module 1224 automatically creates the virtual grade for the academic term in the virtual school as shown in block 706. For example, if the school management module 1224 determines that virtual grade 9 for academic term 2012-2013 does not exist in the virtual school, the school management module 1224 will automatically create virtual grade 9 for academic term 2012-2013 in virtual school Y. The school management module 1224 can create the virtual grade by inserting an entry for the virtual grade in data storage 1234 and associating the virtual grade with the virtual school in data storage 1234 or by a similar process. The school management module 1224 will then create a new virtual class based on the user's input at block 708. On the other hand, if the virtual grade for the academic term exists in the virtual school, then there is no need to create the virtual grade and the school management module 1224 creates a new virtual class based on the user's input as shown in block 708. In another embodiment, a virtual school associated with the virtual class can be automatically created when the virtual class is created if the virtual school does not already exist. Different rules for automatic group creation based on the hierarchical structure of groups can be set depending on usage and need.

In one embodiment, the name of the automatically created virtual group can be generated according to a naming pattern. For example, a naming pattern such as "<school name>[school location name]-[grade] (year span)" can be used to generate names for automatically created virtual grades. Using this pattern, a virtual grade for grade 9 for academic term 2012-2013 in school Y located in Palo Alto will have the name "School Y [Palo Alto]-[Grade 9] (2012-2013)." Other patterns and naming conventions can be used without leaving the spirit of the present invention. In another embodiment, virtual schools and/or virtual classes can be named according to a naming pattern. A naming pattern for a virtual school can include, but is not limited to, school district, school location, and school ID. A naming pattern for a virtual class can include, but is not limited to, school name, grade, academic term, and class ID. Other descriptors for identifying a virtual school, virtual grade, or virtual class may be included in a naming pattern as well.

Figure 8:
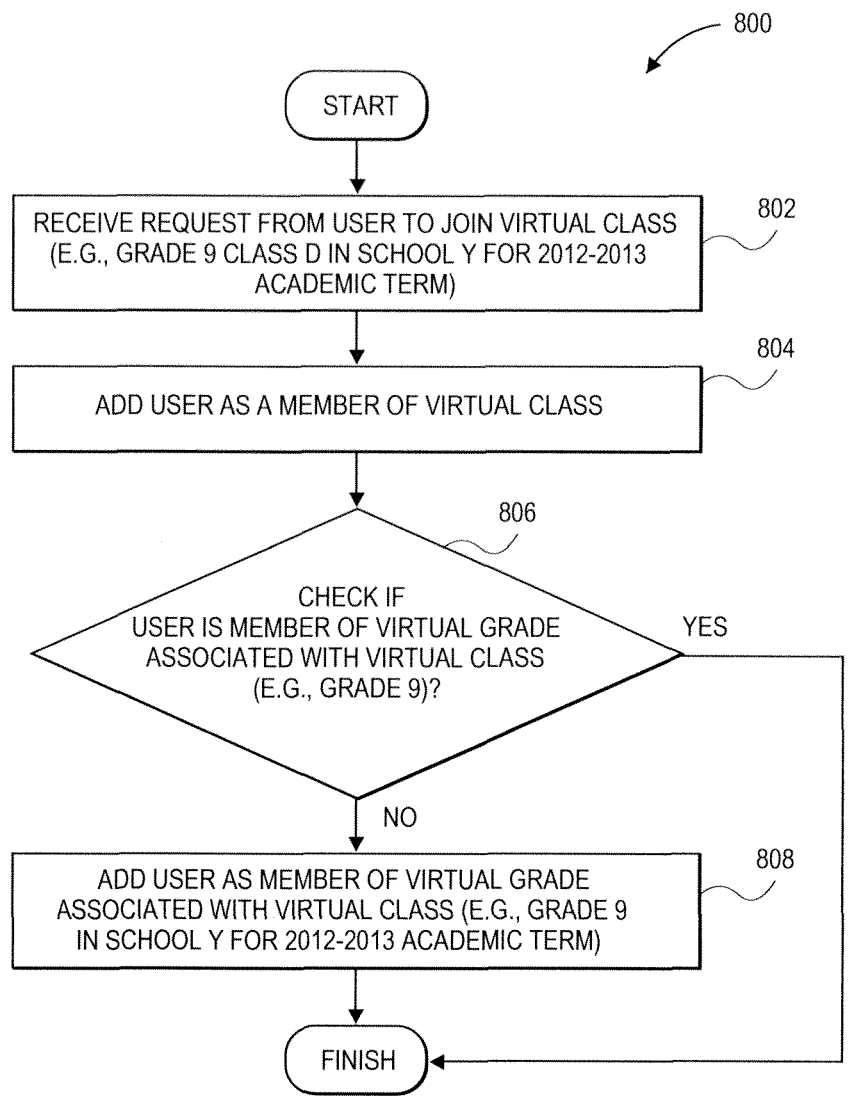
FIG. 8 is a flow diagram illustrating one embodiment of a process by a server to automatically add a user as a member of a virtual grade when adding the user as a member of a virtual class on the platform.

FIG. 8 is a flow diagram illustrating one embodiment of a process by a server 1216 to automatically add a user as a member of a virtual grade when adding the user as a member of a virtual class on the platform. As illustrated in FIG. 2, a school can be organized in a hierarchical structure where each school has several grades and each grade has several classes. The platform can set a rule that whenever a user joins a virtual class, that user is automatically assigned membership to all higher level groups associated with the virtual class. For example, referring to FIG. 2, when a user joins virtual class D 220, the user is automatically added as a member of the virtual grade associated with virtual class D (i.e., Grade 9 2012-2013).

Referring to FIG. 8, at block 802, the web server module 1222 receives a request from a user to join a virtual class. For example, a user may request to join virtual class D 220 in grade 9 of school Y for the 2012-2013 academic term. At block 804, school management module 1224 adds the user as a member of the virtual class. At decision block 806, the school management module 1224 checks if the user is a member of the virtual grade associated with the virtual class. For example, the school management module 1224 will check if the user is a member of virtual grade 9 of virtual school Y for the 2012-2013 academic term. School management module 1224 can check user membership by querying data storage 1234 or by a similar process. If the user is not a member of the virtual grade associated with the virtual class, then the user is added as a member of the virtual grade associated with the virtual class as shown in block 808. School management module 1224 can add a user as a member of a virtual grade by inserting an entry into data storage 1234 indicating that user is a member of virtual grade or by a similar process. For example, if the user is not already a member of virtual grade 9 for the 2012-2013 academic term, the user will be added as a member of grade 9 for the 2012-2013 academic term. On the other hand, if the user is already a member of the virtual grade, then there is no need to add the user as a member of the virtual grade and the process is finished. In another embodiment, a user can be automatically added as a member of the virtual school associated with the virtual class. Different rules for automatic user membership assignment based on the hierarchical structure of groups can be set depending on usage and need.

In one embodiment, when a user is removed from membership in a virtual class, the user is also removed from membership in the virtual grade associated with the virtual class, provided that the user is no longer a member of any classes associated with the virtual grade. In another embodiment users are automatically removed from virtual classes and/or virtual grades when the academic term associated with the virtual class and/or virtual grade ends. In another embodiment, users may retain their membership in a virtual class even after the academic term ends so that members of the virtual class can continue to communicate with each other even after the class ends.

For simplicity and clarity of illustration, an education networking platform with a hierarchical school, grade, and class structure has been used as an example to illustrate automatic group creation and automatic user membership assignment. However, automatic group creation and user membership assignment can be applied to other types of networking platforms that use different types of group structures.

Figure 9:
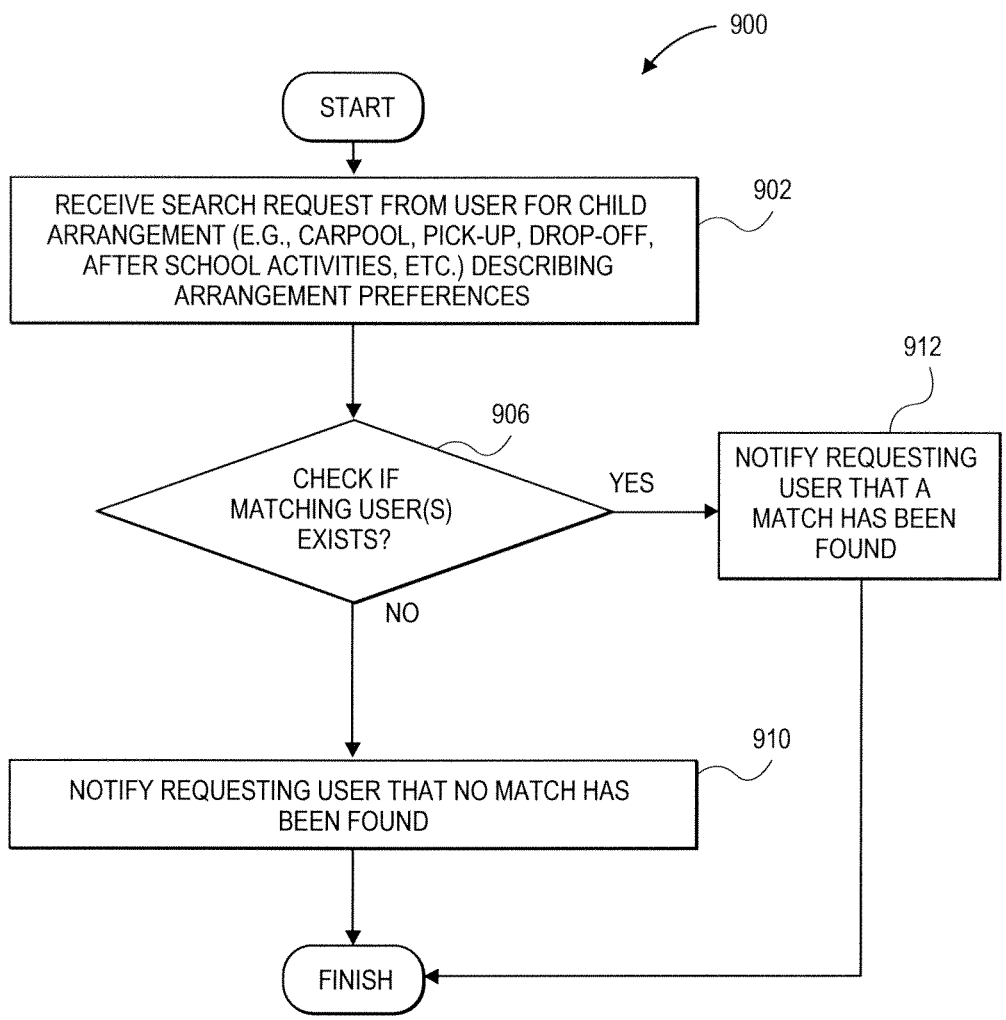
FIG. 9 is a flow diagram illustrating one embodiment of a process by a server to search for matching users that match the child arrangement preferences of a requesting user.

FIG. 9 is a flow diagram illustrating one embodiment of a process by a server 1216 to search for matching users that match the child arrangement preferences of a requesting user.

At block 902, the web server module 1222 receives a search request from a requesting user for child arrangement describing arrangement preferences. For example, child arrangement can be for carpool, pick-up, drop-off, after school activities. Arrangement preferences can include, but is not limited to, date, time, location, number of car seats needed/available, distances, family background, etc. In one embodiment, the user can indicate some of the criteria as required, some of the criteria as preferred, or leave some criteria empty. At decision block 906, the matching module 1230 checks if a matching user that matches the arrangement preferences exists in the online platform. The matching module 1230 can check for a match by querying data storage 1234 for users that match the criteria indicated by the requesting user. Matching module 1230 may check for a match by matching the requesting user's criteria against previously stored information about other users in data storage 1234 such as group membership(s), calendar schedule, number of seats available in car, or any other information that is relevant for arranging carpool and activities. If a match is found, the notification module 1226 notifies the requesting user that a match has been found as shown in block 912. The requesting user may then contact the matching user through the platform to further discuss the details for child arrangement. If a match is not found, the notification module 1226 notifies the user that no match has been found as shown in block 910 and the user has an option to post the request on the platform.

Figure 10:
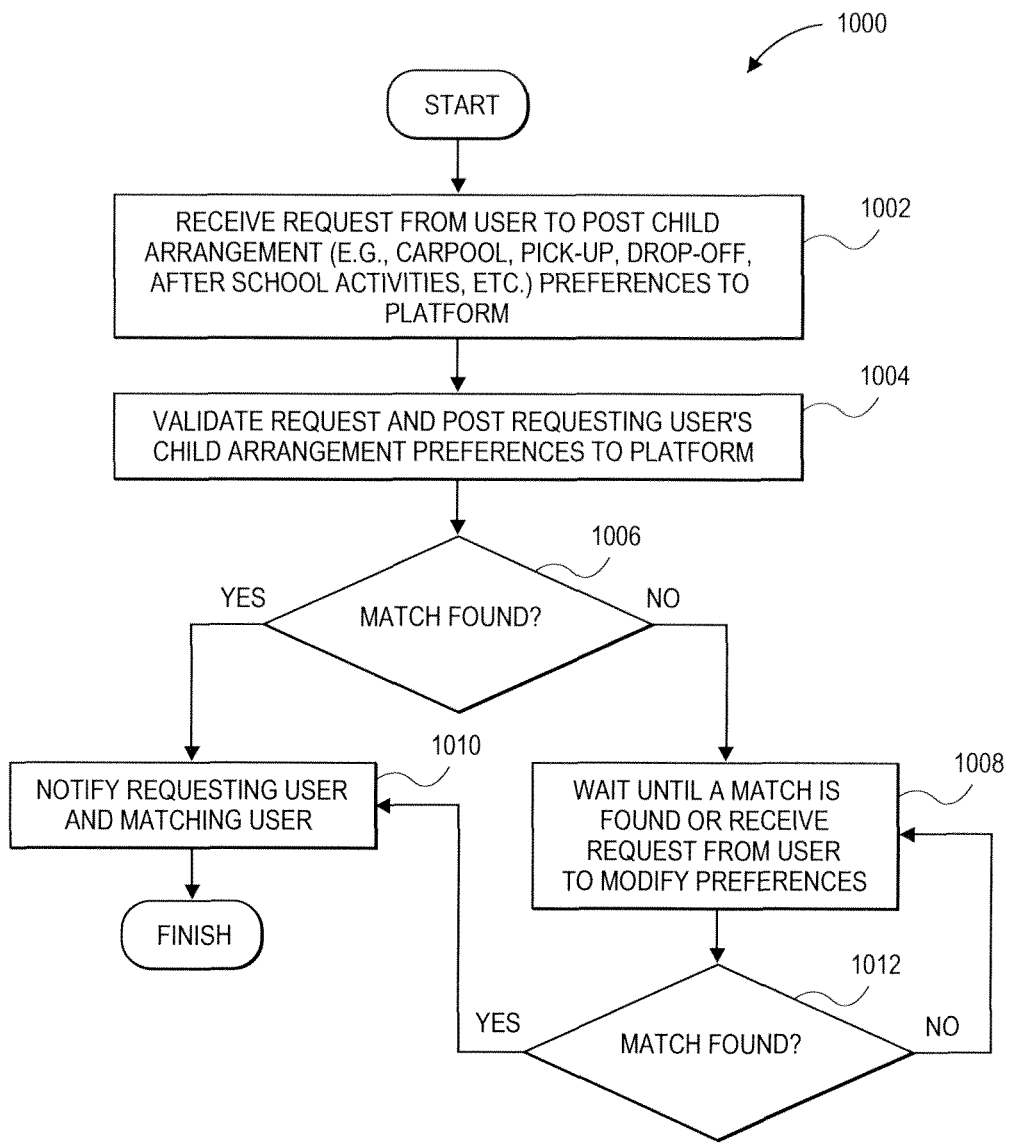
FIG. 10 is a flow diagram illustrating one embodiment of a process by a server to post child arrangement preferences of a requesting user to the platform.

FIG. 10 is a flow diagram illustrating one embodiment of a process by a server 1216 to post child arrangement preferences of a requesting user to the platform.

At block 1002, the web server module 1222 receives a request from a user to post child arrangement preferences to the platform. For example, child arrangement can be for carpool, pick-up, drop-off, after school activities. Arrangement preferences can include, but is not limited to, date, time, location, number of car seats needed/available, distances, family background, etc. In one embodiment, the user can indicate some of the criteria as required, some of the criteria as preferred, or leave some criteria empty. The matching module 1230 validates the request and posts the requesting user's child arrangement preferences to the platform at block 1004. The matching module 1230 searches for a matching user that matches the child arrangement preferences by querying data storage 1234. Matching module 1230 may check for a match by matching the requesting user's criteria against previously stored information about other users in data storage 1234 such as group membership(s), calendar, schedule, number of seats available in car, or any other information that is relevant for arranging carpool and activities. At decision block 1006, if a match is found, the requesting user and matching user are notified of the match as shown in block 1010. On the other hand, if a match is not found, at block 1008, the requesting user can wait until a match is found or can modify the arrangement preferences. In one embodiment, the matching module 1230 can periodically check for a match at decision block 1012 until a match is found or until the requesting user removes the request for child arrangement. When a match is found, the requesting user and matching user are notified of the match as shown in block 1010. The requesting user may then contact the matching parent through the platform to further discuss the details for child arrangement. In other embodiments, the requesting user may contact the matching parent through email, text message, phone, or any other method of communication.

Figure 11:
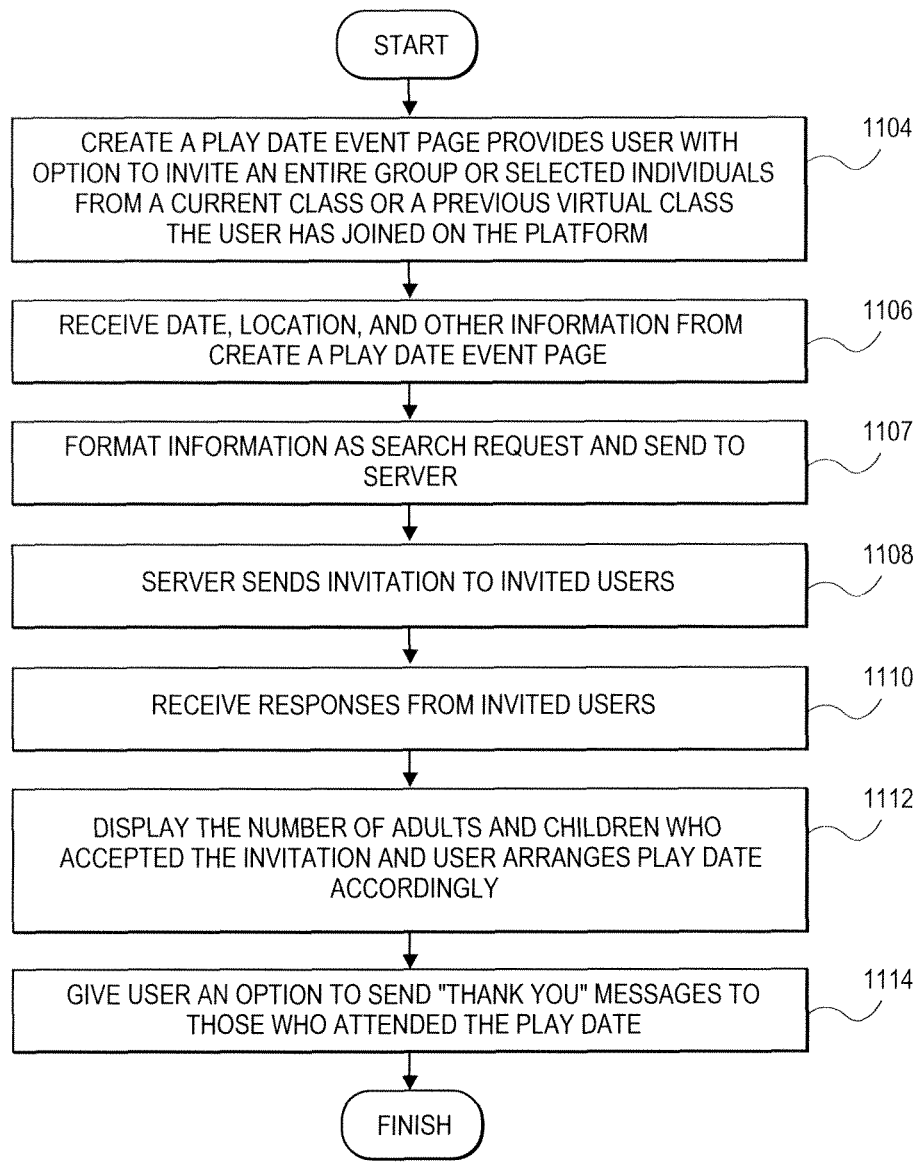
FIG. 11 is a flow diagram illustrating one embodiment of how a user can interact with the platform to organize a play date event for children from the client application and user experience perspective.

FIG. 11 is a flow diagram illustrating one embodiment of how a user can interact with other parents on the platform to organize a play date event for children from the client application 1204, 1208, or 1212 and user experience perspective.

Referring to FIG. 11, a user opens a "create a play date event" page from client application 1204, 1208, or 1212. The user interface of client application 1204, 1208, or 1212 provides the user with the option to invite an entire group or selected individuals from a current virtual school, grade or class or a previous virtual school, grade or class the user has joined on the platform as shown in block 1104. Using the client application 1204, 1208, or 1212, the parent fills in the date, location and other relevant information for the play date event then clicks a "send invitation" button. Upon receiving this input from a user at block 1106, the client application 1204, 1208, or 1212 formats the information as a play date invitation request and sends it to the server 1216 as shown in block 1107. The server 1216 receives the request and sends an invitation to the invited users as shown in block 1108. The invitation can be sent as a link in an email or as a notification displayed by the client application 1204, 1208, or 1212 or through any other communication method. The invited users can respond to the invitation by opening the invitation link from the email or by responding to the invitation from the client application 1204, 1208, or 1212, or through any other communication method as shown in block 1110. After invited users have responded, the client application 1204, 1208, or 1212 can display to the user the total number of adults and children who accepted the invitation and the user can arrange the play date accordingly, as shown in block 1112. The client application 1204, 1208, or 1212 can also display details about the invited users such as their name, contact information, reasons for declining invitation, comments provided with acceptance of the invitation, time of accepting invitation, time of declining invitation, whether an invited user has viewed the invitation, and other details. After the play date event, the client application 1204, 1208, or 1212 gives the user an option to send out "Thank You" messages to those who attended the play date, as shown in block 1114.

Although the online networking platform described in the present disclosure focuses on allowing parents to communicate with one another, the platform can also be used to facilitate communication between teachers/schools and parents. It will be understood that teachers/schools may also join the platform and perform one or more of the functionalities described herein such as creating virtual schools/grades/classes/groups, posting messages to different hierarchy levels, and organizing activities through the platform. Also, one of ordinary skill in the art will understand that the platform can be applied to other types of communities without departing from the principles and spirit of the present invention. For example, the platform may be modified for use as a neighborhood collaboration platform with country, state, city, and street as hierarchy levels so that neighborhood residents can collaborate and communicate with one another.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a server in communication with a client for supporting an online communication platform for parents of children enrolled at a school, where the school is represented as one of a set of virtual schools managed by the online communication platform, where a user of the online communication platform is one of the parents of the children enrolled at the school, and where the online communication platform tracks a hierarchy of a set of virtual classes for each virtual grade at each virtual school in the set of virtual schools, the method comprising:
receiving from the client a school search request describing school search criteria;
searching the hierarchy of virtual schools, virtual grades and virtual classes that is automatically generated from creation of virtual classes by a plurality of the parents to find a subset of virtual schools that match the school search criteria;
sending to the client the subset of virtual schools that match the school search criteria;
receiving from the client a grade search request describing grade search criteria;
searching the hierarchy to find a subset of virtual grades matching the grade search criteria;
sending to the client the subset of virtual grades that match the grade search criteria;
receiving from the client a class search request describing class search criteria;
searching the hierarchy to find a subset of virtual classes matching the class search criteria;
sending to the client the subset of virtual classes that match the class search criteria;
receiving from the client a selection of a virtual class from the subset of virtual classes, the virtual class corresponding to a real-world class offered during an academic term; and
adding the user as a member of the selected virtual class and corresponding virtual grade and virtual school to enable communication electronically via the server and the online communication platform with other users associated with the selected virtual class and corresponding virtual grade and virtual school.

2. The method of claim 1 wherein the class search criteria includes any one of child name, class name, grade, teacher name, academic term, or classroom name.

3. The method of claim 1 wherein the class search criteria includes any one of school location or school name.

4. The method of claim 1 wherein the school search criteria includes any one of a school location or a school name.

5. The method of claim 1 further comprising:
receiving from the client a selection of members selected by the user from any one of the virtual class, a virtual grade, and a virtual school; and
sending a message to the selected members.

6. The method of claim 5 wherein the message is an event invitation, the method further comprising:
recording attendance response of invitees; and
notifying the user with a list of adults and children that accepted the event invitation.

7. The method of claim 1 further comprising:
creating a new virtual class in response to receiving a request from the user to create a new virtual class.

8. The method of claim 7 wherein the virtual class is named according to a predefined naming pattern including an indication of school name, academic term, and class ID.

9. The method of claim 7 further comprising:
creating a new virtual grade that is associated with the new virtual class in response to determining that a virtual grade associated with the new virtual class does not exist.

10. The method of claim 9 wherein the virtual grade is named according to a predefined naming pattern including an indication of school name, grade, and academic term.

11. The method of claim 1 further comprising:
creating a new virtual school in response to receiving a request from the user to create a new virtual school.

12. The method of claim 11 wherein the virtual school is named according to a predefined naming pattern including an indication of school name and school location.

13. The method of claim 1 further comprising:
adding the user as a member of the virtual grade in response to receiving a virtual grade join request.

14. The method of claim 13 further comprising:
sending a message to all members of virtual classes associated with the virtual grade in response to receiving a request from the user to send the message to the virtual grade.

15. A system for supporting an online communication platform for parents of children enrolled at a school, the online communication platform having an organization of groups that reflects an organization structure of a real-world school, where the school is represented as one of a set of virtual schools managed by the online communication platform, where a user of the online communication platform is one of the parents of the children enrolled at the school, and where the online communication platform tracks a hierarchy of a set of virtual classes for each virtual grade at each virtual school in the set of virtual schools, the system comprising:
a processor;
a data storage to store data;
a web server module executed by the processor to receive a class search request describing class search criteria, a grade search request describing grade search criteria and a school search request describing school search criteria; and
a school management module executed by the processor to query the data storage for a list of virtual classes from the hierarchy of virtual schools, virtual grades and virtual classes that is automatically generated from creation of virtual classes by a plurality of parents to find a subset of the virtual schools, a subset of the virtual grades and a subset of the virtual classes that match the class search criteria, grade search criteria and school search criteria and to provide a query result to the web server module to send to a client application, the school management module further configured to add a user to a virtual class selected by a user along with a corresponding virtual grade and virtual school in response to receiving a virtual class join request wherein the selected virtual class corresponds to a real-world class offered by a real-world school during an academic term and wherein being a member of the selected virtual class, and corresponding virtual grade and virtual school enable communication electronically via the server and the online communication platform with other users associated with the selected virtual class, and corresponding virtual grade and virtual school.

16. The system of claim 15 further comprising:
a notification module executed by the processor to send a message to a selected member of the virtual class.

17. The system of claim 15 further comprising:
a user management module to register a new user to the online communication platform.

18. A non-transitory computer readable medium having stored therein a set of instructions for supporting an online communication platform for parents of children enrolled at a school, the online communication platform having an organization of groups that reflects an organization structure of a real-world school, where the school is represented as one of a set of virtual schools managed by the online communication platform, where a user of the online communication platform is one of the parents of the children enrolled at the school, and where the online communication platform tracks a hierarchy of a set of virtual classes for each virtual grade at each virtual school in the set of virtual schools, the set of instructions, which when executed, cause a computer to perform a set of operations comprising:
receiving a school search request describing school search criteria;
querying a data storage including the hierarchy of virtual schools, virtual grades and virtual classes that is automatically generated from creation of virtual classes by a plurality of the parents to find a subset of virtual schools that match the school search criteria;
sending a subset of virtual schools obtained from the query for virtual schools to a client application;
adding a user as a member of a virtual school in response to receiving a request to add the user as a member of the virtual school, the virtual school corresponding to a real-world school;
receiving a class search request describing class search criteria for search within the virtual school;
querying the data storage including a portion of the hierarchy for virtual classes of the virtual school that match the class search criteria;
sending a set of virtual classes obtained from the query for virtual classes to a client application; and
adding the user as a member of a virtual class and virtual grade in response to receiving a request to add the user as a member of the virtual class, the virtual class corresponding to a real-world class offered by the real-world school during an academic term, wherein being a member of a virtual class, virtual grade and virtual school enable communication electronically via the server and the online communication platform with other users associated with the virtual class, virtual grade and virtual school.

19. The non-transitory computer readable medium of claim 18, having stored therein a further set of instructions, which when executed cause the computer to perform a further set of operations comprising:
posting a message that is only viewable by a user that is a member of the virtual class in response to receiving a request from the user to post the message to the virtual class.

20. The non-transitory computer readable medium of claim 18, having stored therein a further set of instructions, which when executed cause the computer to perform a further set of operations comprising:
posting a message that is viewable by any user that is a member of any virtual class associated with the virtual school in response to receiving a request from the user to post the message to the virtual school.

21. The non-transitory computer readable medium of claim 18, having stored therein a further set of instructions, which when executed cause the computer to perform a further set of operations comprising:
posting a message that is viewable by any user that is a member of any virtual class associated with the virtual grade in response to receiving a request from the user to post the message to the virtual grade.

22. The non-transitory computer readable medium of claim 18, having stored therein a further set of instructions, which when executed cause the computer to perform a further set of operations comprising:
receiving, from a user, a request to create a new virtual class;
validating that the request contains valid class information; and
creating the new virtual class.

23. The non-transitory computer readable medium of claim 18, having stored therein a further set of instructions, which when executed cause the computer to perform a further set of operations comprising:
merging two or more virtual classes in response to determining that the virtual classes are duplicates.

24. The method of claim 1, further comprising:
receiving from the user an input of child arrangement preferences for car pools, pick-up/drop-offs or after school activities; and
matching the user with other users with similar child arrangement preferences.

25. The method of claim 1, wherein child arrangement preference can include date, time, location, number of car seats needed/available, and distances.

* * * * *